(12) United States Patent
Bai et al.

(10) Patent No.: US 12,163,619 B2
(45) Date of Patent: Dec. 10, 2024

(54) DISPLAY CABINET (71) Applicant: BOE TECHNOLOGY GROUP CO., LTD., Beijing (CN)

(72) Inventors: Hepeng Bai, Beijing (CN); Chunshui Zhou, Beijing (CN); Feng Yuan, Beijing (CN); Hao Liu, Beijing (CN); Lanxin Hu, Beijing (CN); Shihao Shi, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 422 days.

(21) Appl. No.: 17/501,395

(22) Filed: Oct. 14, 2021

(65) Prior Publication Data
US 2022/0128188 A1 Apr. 28, 2022

(30) Foreign Application Priority Data

Oct. 28, 2020 (CN) .......................... 202022433265.4

(51) Int. Cl.
*F16M 11/04* (2006.01)
*A47F 5/00* (2006.01)
*A47F 11/06* (2006.01)
*G06F 1/16* (2006.01)

(52) U.S. Cl.
CPC ......... *F16M 11/046* (2013.01); *A47F 5/0081* (2013.01); *A47F 11/06* (2013.01); *G06F 1/1607* (2013.01); *F16M 2200/047* (2013.01)

(58) Field of Classification Search
CPC ........... F16M 11/046; F16M 2200/047; F16M 11/18; A47F 5/0081; A47F 3/005; A47F 11/06; G06F 1/1607; A47B 81/064; A47B 51/00; A47G 1/12
See application file for complete search history.

(56) References Cited

U.S. PATENT DOCUMENTS

| 6,322,174 | B1 * | 11/2001 | Palmqvist | A47G 1/0622 312/140 |
| 11,194,361 | B1 * | 12/2021 | Cho | G06F 3/147 |
| 2002/0079788 | A1 * | 6/2002 | Canedy | A47F 3/002 312/114 |
| 2006/0017356 | A1 * | 1/2006 | Hoss | A47B 81/06 312/319.7 |
| 2006/0063595 | A1 * | 3/2006 | Kondo | F16M 11/045 463/46 |
| 2006/0076860 | A1 * | 4/2006 | Hoss | A47B 81/064 312/312 |

(Continued)

FOREIGN PATENT DOCUMENTS

CN 108209333 A * 6/2018
CN 111681466 A * 9/2020
(Continued)

OTHER PUBLICATIONS

Translation for KR-970060537U (Year: 1997).*

*Primary Examiner* — Hiwot E Tefera
(74) *Attorney, Agent, or Firm* — Dority & Manning, P.A.

(57) ABSTRACT

A display cabinet includes: a case with an opening at a side thereof, a transparent display screen disposed at the opening, and a drive device connected with the transparent display screen. The drive device is configured to drive the transparent display screen to be movable between a position covering the opening and a position exposing the opening.

16 Claims, 11 Drawing Sheets

(56) References Cited

U.S. PATENT DOCUMENTS

| | | | | |
|---|---|---|---|---|
| 2008/0116772 A1* | 5/2008 | Champagne | .......... | E04H 13/008 |
| | | | | 312/138.1 |
| 2008/0174215 A1* | 7/2008 | Amstutz | .................. | E05G 1/00 |
| | | | | 312/117 |
| 2009/0145804 A1* | 6/2009 | Kabel | ....................... | A47F 7/03 |
| | | | | 206/783 |
| 2011/0041371 A1* | 2/2011 | Grauer | ................. | A47G 1/0622 |
| | | | | 40/714 |
| 2012/0285089 A1* | 11/2012 | Artwohl | ............... | A47F 3/0434 |
| | | | | 49/70 |
| 2014/0121838 A1* | 5/2014 | Ahn | ........................ | G05D 3/00 |
| | | | | 700/275 |
| 2015/0013226 A1* | 1/2015 | Artwohl | .............. | E05D 13/1261 |
| | | | | 49/31 |
| 2015/0124164 A1* | 5/2015 | Sin | ........................ | G06F 3/1446 |
| | | | | 348/460 |
| 2016/0202786 A1* | 7/2016 | Lee | ....................... | G06F 1/1637 |
| | | | | 345/173 |
| 2017/0205700 A1* | 7/2017 | Koo | ........................ | F16B 47/00 |
| 2017/0226790 A1* | 8/2017 | Brenneis | ................. | E05D 15/22 |
| 2018/0111408 A1* | 4/2018 | Rochman | ............. | A47B 97/001 |
| 2018/0310705 A1* | 11/2018 | Game | .................... | A47B 21/04 |
| 2020/0103069 A1* | 4/2020 | You | ....................... | F16M 11/046 |
| 2020/0315343 A1* | 10/2020 | Lynch | .................... | A47B 69/00 |
| 2022/0007835 A1* | 1/2022 | Gajapala | ............. | F16M 11/046 |

FOREIGN PATENT DOCUMENTS

| | | | | | |
|---|---|---|---|---|---|
| CN | 111963841 | A | * | 11/2020 | |
| CN | 114550516 | A | * | 5/2022 | |
| CN | 115199898 | A | * | 10/2022 | |
| DE | 202004014442 | U1 | * | 1/2005 | ............. A47F 3/002 |
| EP | 4170221 | A1 | * | 4/2023 | ........... A47B 81/064 |
| KR | 970060537 | U | * | 12/1997 | ............... A47F 3/00 |
| KR | 20040028235 | A | * | 4/2004 | ............ E05F 15/676 |
| KR | 101756832 | B1 | * | 7/2017 | |

* cited by examiner

DISPLAY CABINET

CROSS-REFERENCE TO RELATED APPLICATION

This application claims priority to Chinese Patent Application No. 202022433265.4, filed on Oct. 28, 2020, which is incorporated herein by reference in its entirety.

TECHNICAL FIELD

The present disclosure relates to electronic display equipment, and in particular, to a display cabinet.

BACKGROUND

A display cabinet is mainly composed of a transparent display screen and a case (e.g., light-emitting case). Light inside the case can pass through the transparent screen, so that people can see a real object behind the transparent screen and obtain information showed on the transparent screen, simultaneously. Therefore, the display cabinet may be applied in various occasions, such as shopping malls, museums, or exhibition halls, which is used for interactive display of samples or show of advertisements.

SUMMARY

In an aspect, a display cabinet is provided. The display cabinet includes: a case with an opening at a side thereof, a transparent display screen disposed at the opening, and a drive device connected with the transparent display screen. The drive device is configured to drive the transparent display screen to be movable between a position covering the opening and a position exposing the opening.

In some embodiments, the drive device is connected with one end portion of two opposite end portions of the transparent display screen.

In some embodiments, the drive device includes an action mechanism. The action mechanism includes at least one of: a screw drive mechanism, a cylinder mechanism, a gear and rack mechanism, a crank and slider mechanism, a chain mechanism, or a reel and belt mechanism.

In some embodiments, the action mechanism includes the screw drive mechanism. The screw drive mechanism includes: a screw shaft, and a rotary member pivotally connected with the screw shaft. The rotary member is further fixedly connected with the end portion of the transparent display screen.

In some embodiments, the action mechanism includes the cylinder mechanism. The cylinder mechanism includes: a cylinder barrel, and a piston rod connected with the cylinder barrel. The piston rod is further fixedly connected with the end portion of the transparent display screen.

In some embodiments, the action mechanism includes the gear and rack mechanism. The gear and rack mechanism includes: a gear, and a rack connected with the gear. The rack is further fixedly connected with the end portion of the transparent display screen.

In some embodiments, the action mechanism includes the crank and slider mechanism. The crank and slider mechanism includes: a bracket, a crank connected with the bracket, a connecting rod connected with the crank, and a slider connected with the connecting rod. The slider is further fixedly connected with the end portion of the transparent display screen.

In some embodiments, the action mechanism includes the chain mechanism. The chain mechanism includes: a sprocket, and a chain meshing with the sprocket. An end of the chain is fixedly connected with the end portion of the transparent display screen.

In some embodiments, the action mechanism includes the reel and belt mechanism. The reel and belt mechanism includes: a reel and a belt. One end of the belt is fixedly connected with the reel, and another end of the belt is fixedly connected with the end portion of the transparent display screen.

In some embodiments, the drive device further includes: a controller and a power source connected with the controller. The power source is configured to provide power to the action mechanism under control of the controller.

In some embodiments, the display cabinet further includes: a host configured to transmit and receive signals with the controller, and a connecting line for connecting the host and the transparent display screen. The connecting line is configured to transmit at least one of a video signal, an audio signal, or a data signal.

In some embodiments, the host includes a wireless communication module configured to receive a command sent by an external wireless device to the host.

In some embodiments, the display cabinet further includes an input device configured to send a command to the host through at least one of a voice input or a key input.

In some embodiments, the transparent display screen is a transparent touch display screen.

In some embodiments, the display cabinet further includes: a host and a connecting line for connecting the host and the transparent touch display screen. The host is configured to: provide a display signal to the transparent touch display screen through the connecting line, and receive a touch signal generated in the transparent touch display screen.

In some embodiments, the display cabinet further includes a drag chain track configured to accommodate a conductive line.

In some embodiments, the display cabinet further includes a support device disposed at a side of the case proximate to the end portion the transparent display screen. The support device has a mounting cavity accommodating the drive device.

In some embodiments, the display cabinet further includes: a guide assembly disposed on the support device, and a mating assembly slidably cooperate with the guide assembly. The mating assembly is fixedly connected with the transparent display screen.

In some embodiments, the guide assembly includes a first guide rail and a second guide rail spaced apart from each other. The first guide rail and the second guide rail are fixed at different positions of the support device. The mating assembly includes a first slider and a second slider that are connected with another two opposite end portions of the transparent display screen. The first slider is slideably connected with the first guide rail, and the second slider is slideably connected with the second guide rail.

In some embodiments, the display cabinet further includes a shield plate connected with the support device. The shield plate is configured to shield the transparent display screen when the transparent display screen moves at the position exposing the opening.

BRIEF DESCRIPTION OF THE DRAWINGS

In order to describe technical solutions in the present disclosure more clearly, the accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings in the following description can be regarded as schematic diagrams, and are not limitations on actual sizes of products to which the embodiments of the present disclosure relate.

DETAILED DESCRIPTION

Technical solutions in some embodiments of the present disclosure will be described clearly and completely below with reference to accompanying drawings. However, the described embodiments are merely some but not all of embodiments of the present disclosure. All other embodiments obtained on a basis of the embodiments of the present disclosure by a person of ordinary skill in the art shall be included in the protection scope of the present disclosure.

Unless the context requires otherwise, throughout the specification and the claims, the term "comprise" and other forms thereof such as the third-person singular form "comprises" and the present participle form "comprising" are construed as being open and inclusive, meaning "including, but not limited to." In the description of the specification, the terms "one embodiment", "some embodiments", "exemplary embodiments", "an example", "a specific example" or "some examples" and the like are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled" or "communicatively coupled," however, may also mean that two or more elements are not in direct contact with each other, but yet still co-operate or interact with each other. The embodiments disclosed herein are not necessarily limited in this context.

The use of the phrase "configured to" or "applicable to" herein means an open and inclusive language, which does not exclude devices that are applicable to or configured to perform additional tasks or steps.

In an example, exhibit(s) inside a display cabinet are usually replaced by manually opening a back door or a side door of the display cabinet, which is relatively inconvenient and not suitable for people to get and put samples at any time.

On this basis, in some embodiments of the present disclosure, a display cabinet 1000 is provided. As shown in FIGS. 1 to 4, the display cabinet 1000 includes a case 10 with an opening 11 at a side thereof, a transparent display screen 20 disposed at the opening 11, and a drive device 30 connected with the transparent display screen 20.

The drive device 30 is configured to drive the transparent display screen 20 to be movable between a position covering the opening 11 and a position exposing the opening 11.

One or more exhibits 100 may be placed in the case 10, such as a cultural relic, a luxury, an electronic device, or the like.

For example, the transparent display screen 20 may be a transparent light-emitting diode (LED) display screen, a transparent organic light-emitting diode (OLED) display apparatus, or a transparent liquid crystal display (LCD) screen.

The transparent display screen 20 may not only make light in the case 10 pass therethrough, but also display images. In this way, people can see both the exhibit 100 in the case 10 and images displayed on the transparent display screen 20. The images here may each be a single-frame image or a continuous multi-frame images (i.e., video).

It will be noted that, in a case where the transparent display screen 20 is a transparent LCD screen, the transparent LCD screen needs to display images through backlight due to that liquid crystal molecules in the transparent LCD screen do not have self-luminescence. Therefore, a light source for providing the backlight to the transparent LCD screen may be disposed on an inner surface, facing the transparent LCD screen, of the case 10. Here, the light source may be an LED light source. The light source for providing the backlight may be integrated into the case 10. In this case, the case 10 may be a light-emitting case.

Figure 1:
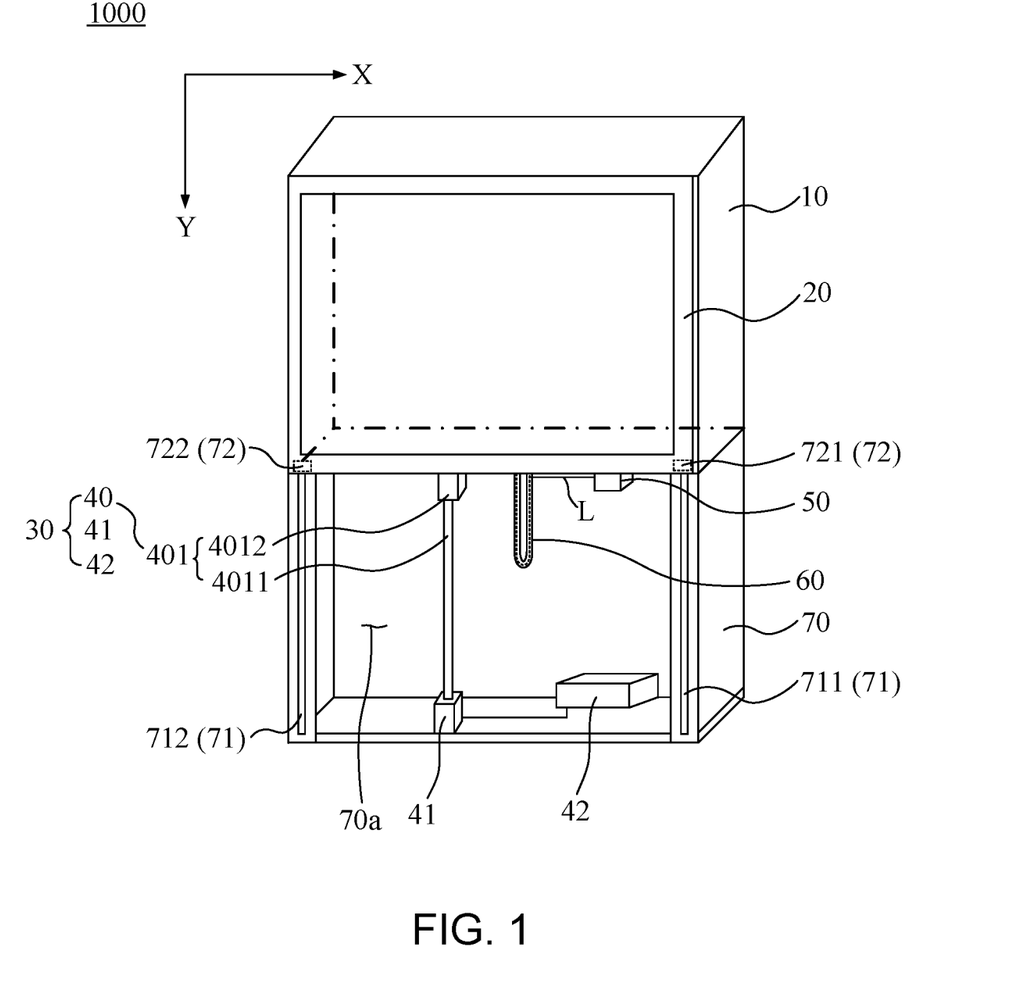
FIG. 1 is a structural diagram of a display cabinet, in accordance with some embodiments.
Figure 2:
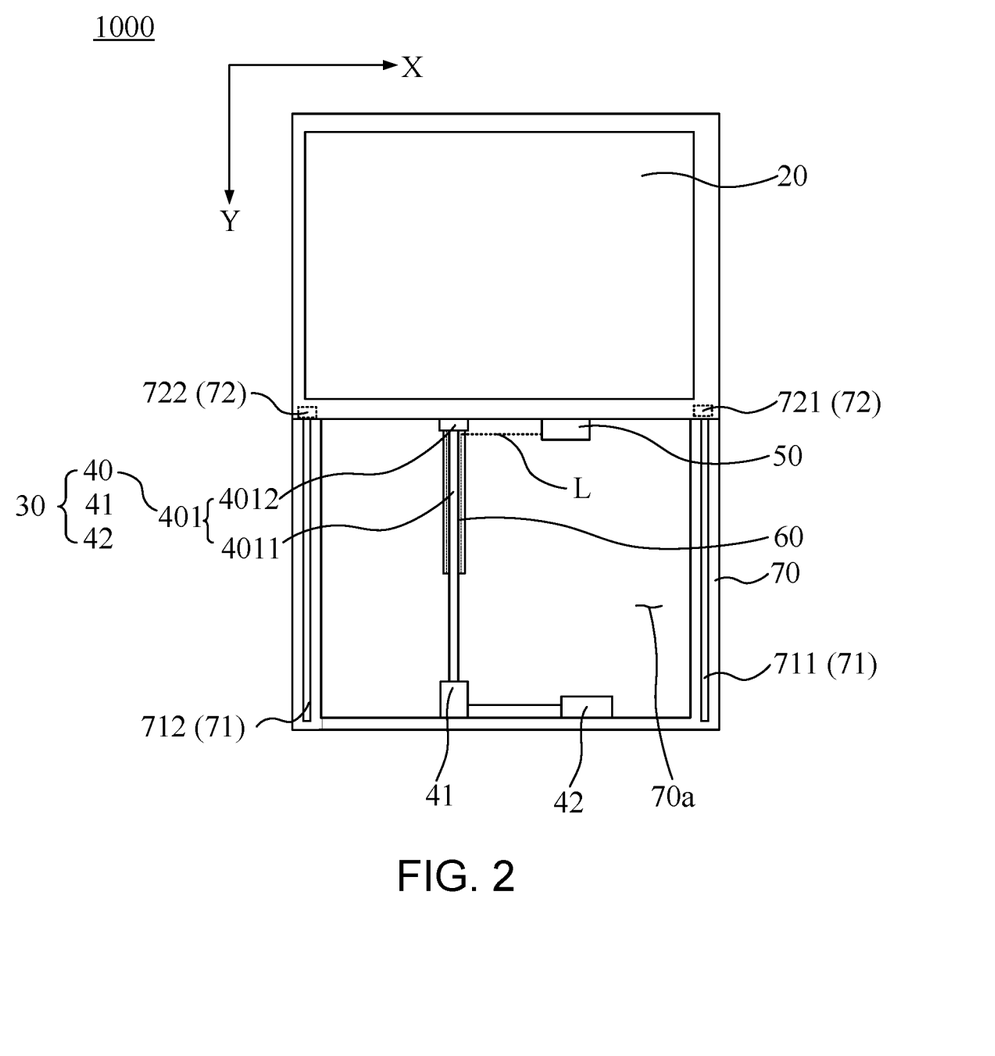
FIG. 2 is a front view of the display cabinet in FIG. 1.
Figure 3:
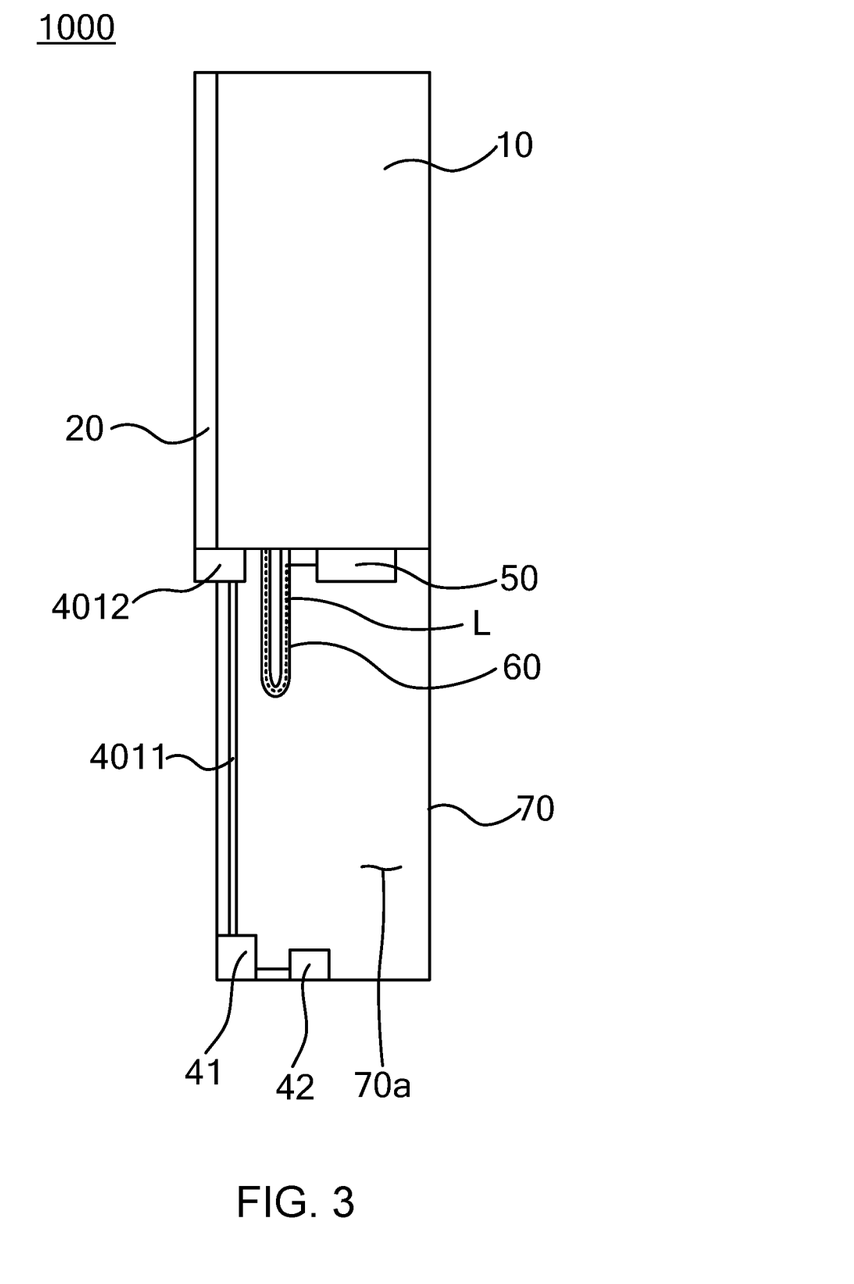
FIG. 3 is a side view of the display cabinet in FIG. 1.

As shown in FIGS. 1 to 3, the transparent display screen 20 is at the position covering the opening 11. In this case, the transparent display screen 20 covers the opening 11, so that a relatively closed space is formed between the transparent display screen 20 and the case 10, which is capable of preventing human hands or external equipment from entering the case 10. Therefore, it is possible to isolate and protect the exhibit 100 inside the case 10. Meanwhile, the transparent display screen 20 may display some texts, pictures, videos and other related data about the exhibit 100, so that the visitors may learn more about the relevant information of the exhibit 100.

Figure 4:
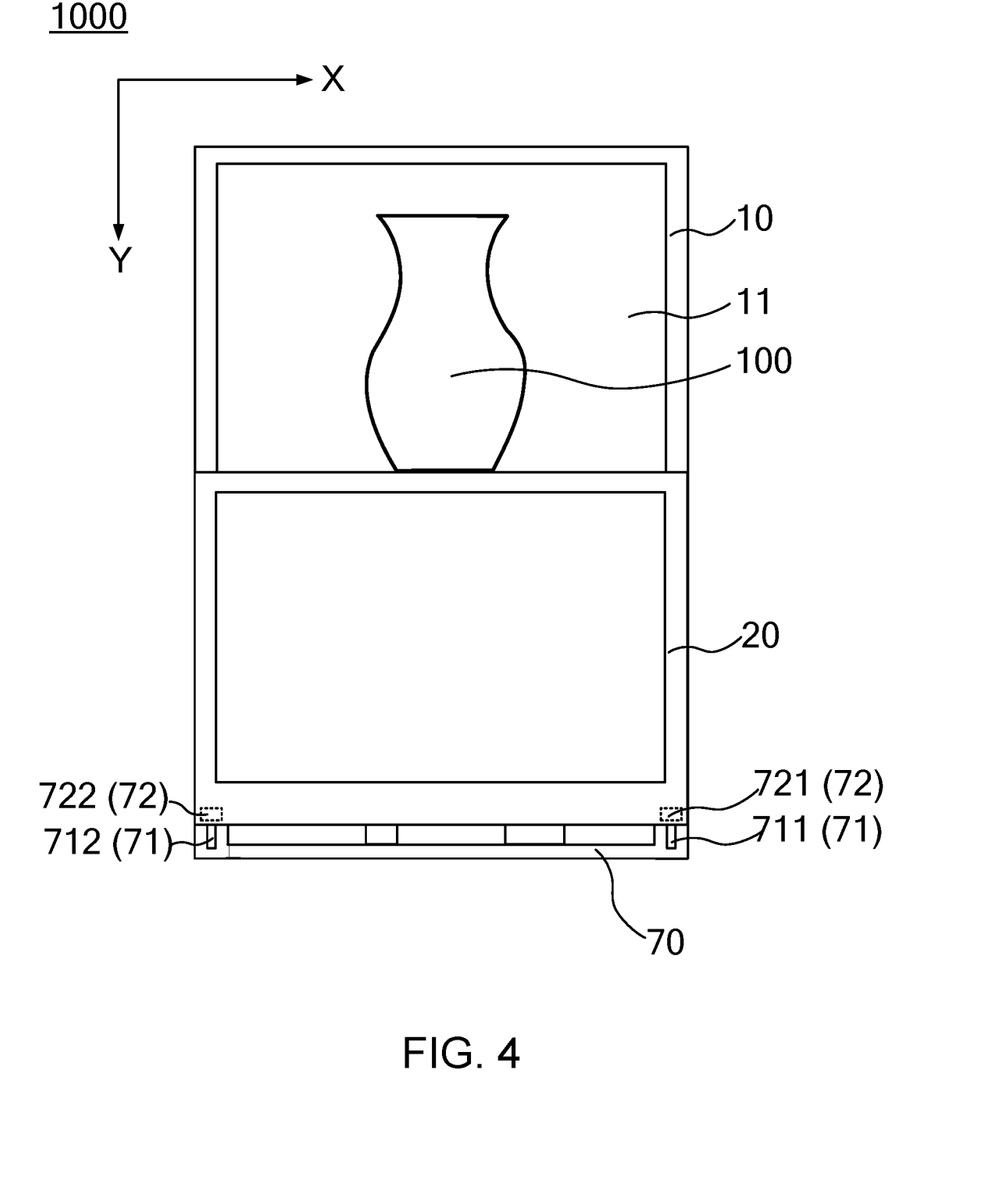
FIG. 4 is a front view of the display cabinet in FIG. 1 in another state.

As shown in FIG. 4, the transparent display screen 20 is at the position exposing the opening 11. In this case, the exhibit 100 may be taken out from the opening 11 for appreciation. After the appreciation is finished, the exhibit 100 may be put back into the case 10 through the opening 11, and the transparent display screen 20 may be moved upwards to the position to cover the opening 11 under driving of the display device (as shown in FIG. 2).

The opening 11 is exposed, which may include two situations in which the opening 11 is completely exposed and the opening 11 is partially exposed. In some examples, in a case where the opening 11 is partially exposed, it is necessary to ensure that a size of an exposed region of the opening 11 is large enough that the exhibit 100 can be taken out from the case 10 and the exhibit 100 can be put back into the case 10. In some other examples, in the case where the opening 11 is partially exposed, the size of the exposed region of the opening 11 is only necessary to ensure that the human hands can reach into the case 10 to touch the exhibit 100 or adjust a position of the exhibit 100.

Hereinafter, for convenience of description, a direction from a left end portion of the transparent display screen 20 to a right end portion of the transparent display screen 20 in FIG. 1 is defined as a first direction X, and a direction from an upper end portion of the transparent display screen 20 to a lower end portion of the transparent display screen 20 is defined as a second direction Y. In some examples, the first direction X may be a horizontal direction, and the second direction Y may be a vertical direction.

In some embodiments, the drive device 30 is configured to drive the transparent display screen 20 to move in the first direction X to close or open the opening 11. In some other embodiments, the drive device 30 is configured to drive the transparent display screen 20 to move in the second direction Y to close or open the opening 11.

In some embodiments, the drive device 30 is connected with at least one of two opposite end portions of the transparent display screen 20. With this design, the drive device 30 does not cover a display area of the transparent display screen 20, so that it is less likely to shield the sight line of human eyes.

In some examples, the drive device 30 is connected with the upper end portion of the transparent display screen 20. In some other examples, the drive device 30 is connected with the lower end portion of the transparent display screen 20. In yet some other examples, the drive device 30 is connected with both the upper end portion and the lower end portion of the transparent display screen 20. FIG. 2 is illustrated by taking an example in which the drive device 30 is connected with the lower end portion of the transparent display screen 20.

Here, it will be noted that, orientations or positional relationships indicated by "upper", "lower", "left", "right", and the like in the text are based on the orientations or positional relationships shown in the accompanying drawings, which are merely to facilitate and simplify the description of the embodiments of the present disclosure, and are not to indicate or imply that the referred devices or elements must have a particular orientation, or must be constructed or operated in a particular orientation, which will not be construed as limitations to the present disclosure.

In the display cabinet 1000 provided by some embodiments of the present disclosure, the transparent display screen 20 may not only display image information of the exhibit 100, but also allow an actual state of the exhibit 100 to be viewed therethrough. Moreover, since the transparent display screen 20 may automatically rise and descend in real time under driving of the drive device 30, and may move between the position covering the opening 11 and the position exposing the opening 11, in a case where the transparent display screen 20 exposes the opening 11 under driving of the drive device 30, the visitors may, for example, take out the exhibit 100 from the display cabinet 1000 through the opening 11 for appreciation. After the appreciation is finished and the exhibit 100 is put back into the case 10, the transparent display screen 20 may cover the opening 11 under driving of the drive device 30. Visitors' experience may be improved due to that the display cabinet 1000 is more suitable and reliable in exhibition.

In some embodiments, the drive device 30 includes an action mechanism 40. The action mechanism 40 includes at least one of a screw drive mechanism 401, a cylinder mechanism 402, a gear and rack mechanism 403, a crank and slider mechanism 404, a chain mechanism 405, or a reel and belt mechanism 406.

In some examples, as shown in FIGS. 1 to 3, the action mechanism 40 includes the screw drive mechanism 401. The screw drive mechanism 401 includes a screw shaft 4011 and a rotary member 4012. The rotary member 4012 is pivotally connected with the screw shaft 4011, and is fixedly connected with an end portion (e.g., lower end portion) of the transparent display screen 20. In this way, when the screw shaft 4011 rotates, the rotary member 4012 rises and descends along the screw shaft 4011, thereby driving the transparent display screen 20 to move between the position covering the opening 11 and the position exposing the opening 11.

In some examples, the rotary member 4012 is of a nut structure.

In some other examples, the rotary member 4012 is of a structure composed of a nut and balls. When the nut moves along the screw shaft 4011, the balls may roll along an inner raceway of the nut to reduce a frictional resistance, thereby having advantages of low wear, high transmission efficiency, smooth transmission, long life, high accuracy, and low temperature rise, etc.

Figure 5:
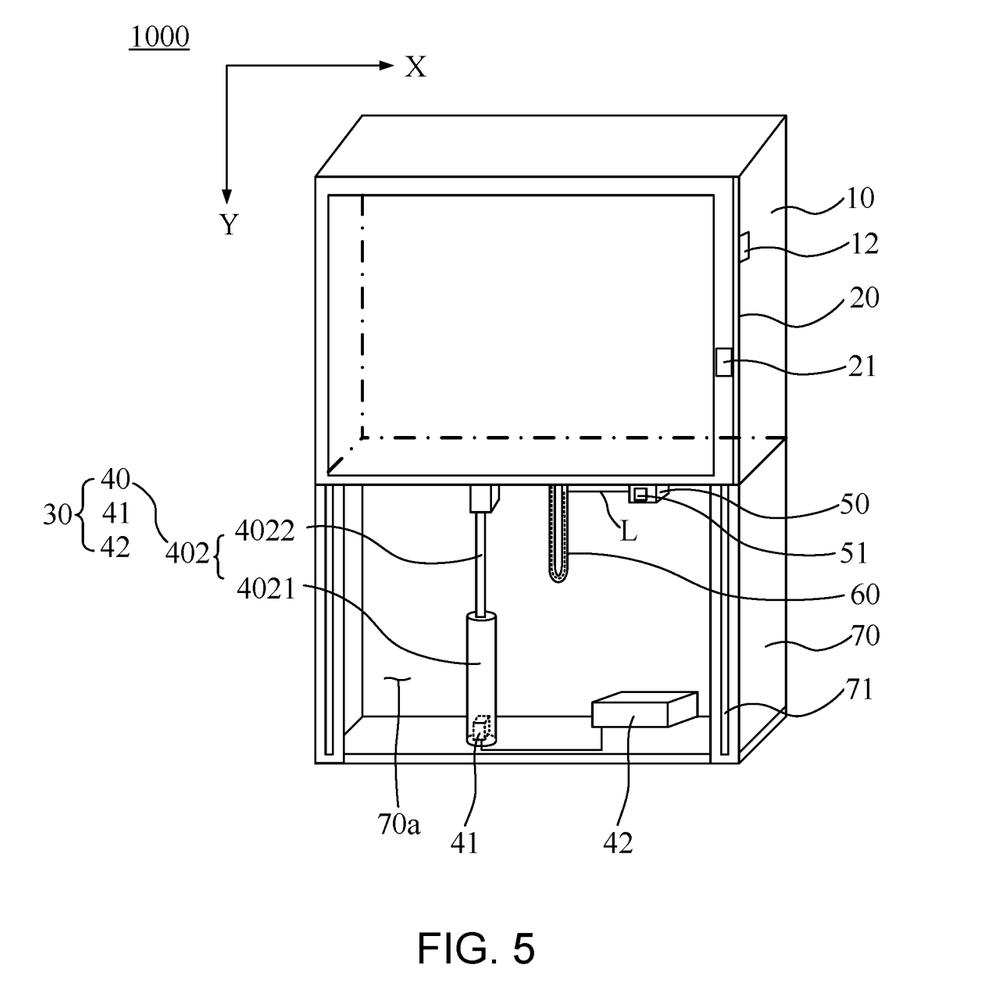
FIG. 5 is a front view of another display cabinet, in accordance with some embodiments.

In some examples, as shown in FIG. 5, the action mechanism 40 includes the cylinder mechanism 402. The cylinder mechanism 402 includes a cylinder barrel 4021 and a piston rod 4022. An end of the piston rod 4022 is connected with an internal structure of the cylinder barrel 4021, and the other end of the piston rod 4022 is fixedly connected with an end portion (e.g., lower end portion) of the transparent display screen 20. When the piston rod 4022 moves in the second direction Y, it may drive the transparent display screen 20 to move between the position covering the opening 11 and the position exposing the opening 11 in the second direction Y. For example, two or more cylinders may be provided to cooperatively achieve a vertical movement, which is not limited in the embodiments of the present disclosure.

Figure 6:
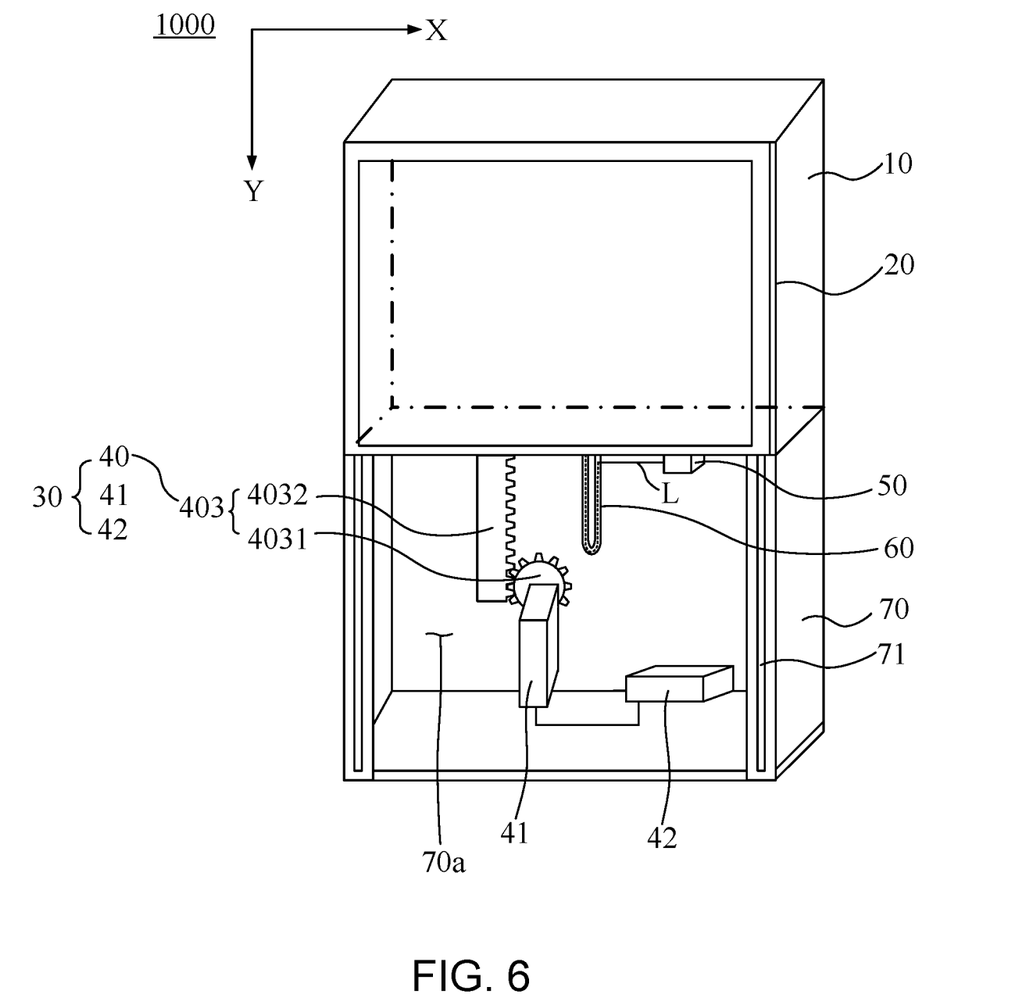
FIG. 6 is a structural diagram of another display cabinet, in accordance with some embodiments.

In some examples, as shown in FIG. 6, the action mechanism 40 includes the gear and rack mechanism 403. The gear and rack mechanism includes a gear 4031 and a rack 4032. The gear 4031 meshes with the rack 4032, and an end portion of the rack 4032 may also be fixedly connected with an end portion (e.g., lower end portion) of the transparent display screen 20. In this way, when the gear 4031 rotates, it may drive the rack 4032 to move linearly in the second direction Y, thereby driving the transparent display screen 20 to move between the position covering the opening 11 and the position exposing the opening 11.

Figure 7:
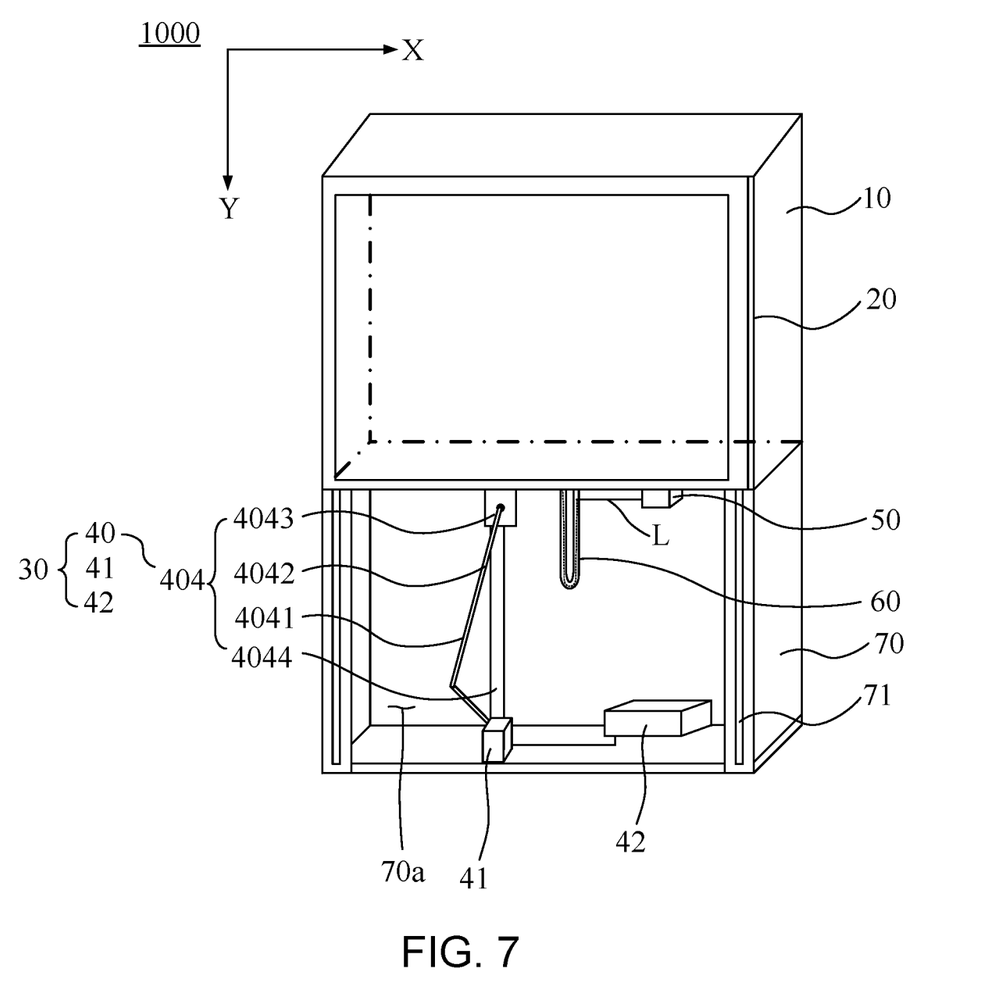
FIG. 7 is a structural diagram of yet another display cabinet, in accordance with some embodiments.

In some examples, as shown in FIG. 7, the action mechanism 40 includes the crank and slider mechanism 404. The crank and slider mechanism 404 includes a crank 4041, a connecting rod 4042, a slider 4043, and a bracket 4044. The slider 4043 is fixedly connected with the connecting rod 4042, and the slider 4043 may perform a vertical movement along the bracket 4044 when the crank 4041 drives the connecting rod 4042 to move. The slider 4043 may also be fixedly connected with an end portion (e.g., lower end portion) of the transparent display screen 20. The slider 4043 may perform the vertical movement linearly along the bracket 4044, thereby driving the transparent display screen 20 to move between the position covering the opening 11 and the position exposing the opening 11 in the second direction Y.

Figure 8:
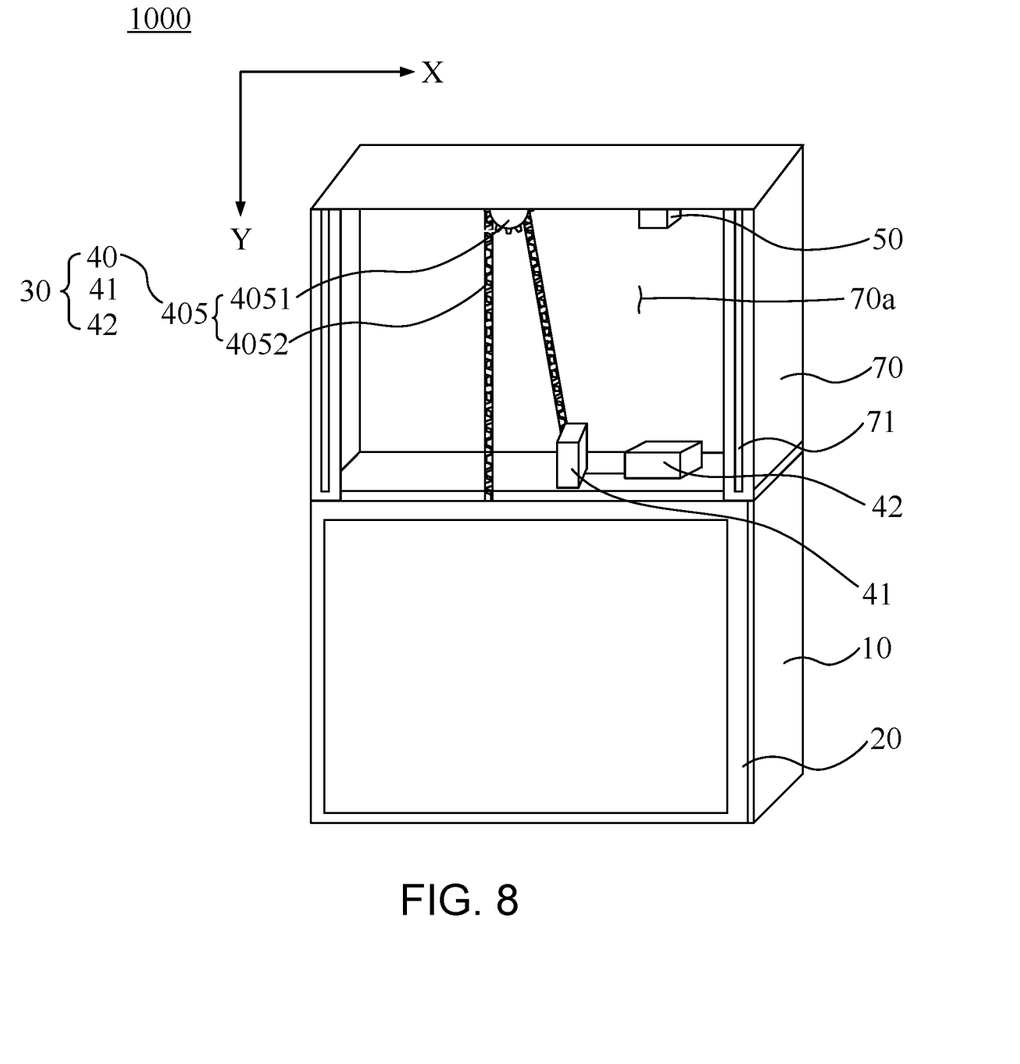
FIG. 8 is a structural diagram of yet another display cabinet, in accordance with some embodiments.

In some examples, as shown in FIG. 8, the action mechanism 40 includes the chain mechanism 405. The chain mechanism 405 includes a sprocket 4051 and a chain 4052. The sprocket 4051 meshes with the chain 4052, and an end of the chain 4052 is fixedly connected with an end portion (e.g., lower end portion) of the transparent display screen 20. The sprocket 4051 cooperates with the chain 4052 to drive the transparent display screen 20 to move between the position covering the opening 11 and the position exposing the opening 11 in the second direction Y. For example, two or more chains and two or more sprockets may be provided to cooperatively achieve the vertical movement, which is not limited in the embodiments of the present disclosure.

Figure 9:
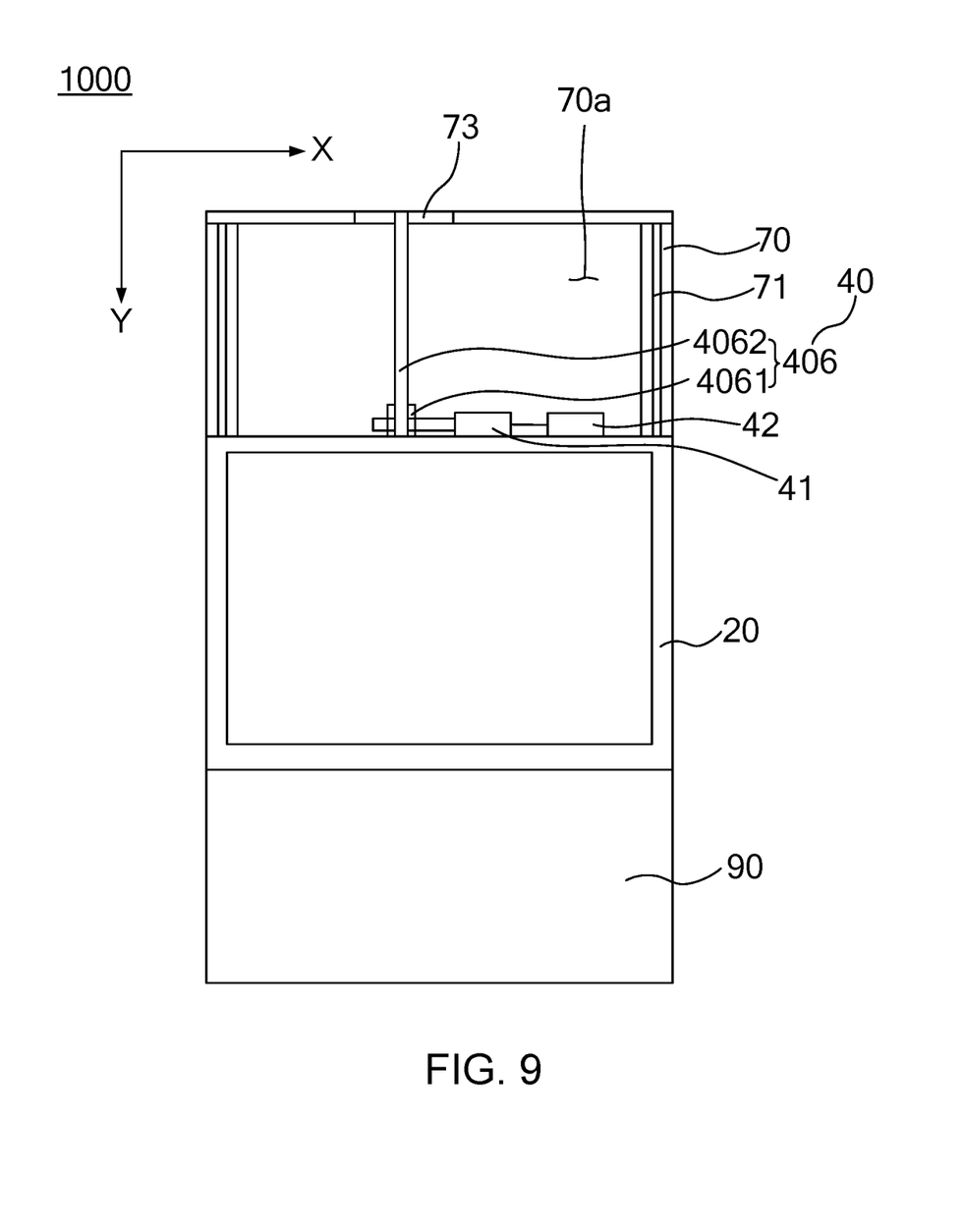
FIG. 9 is a front view of another display cabinet, in accordance with some embodiments.
Figure 10:
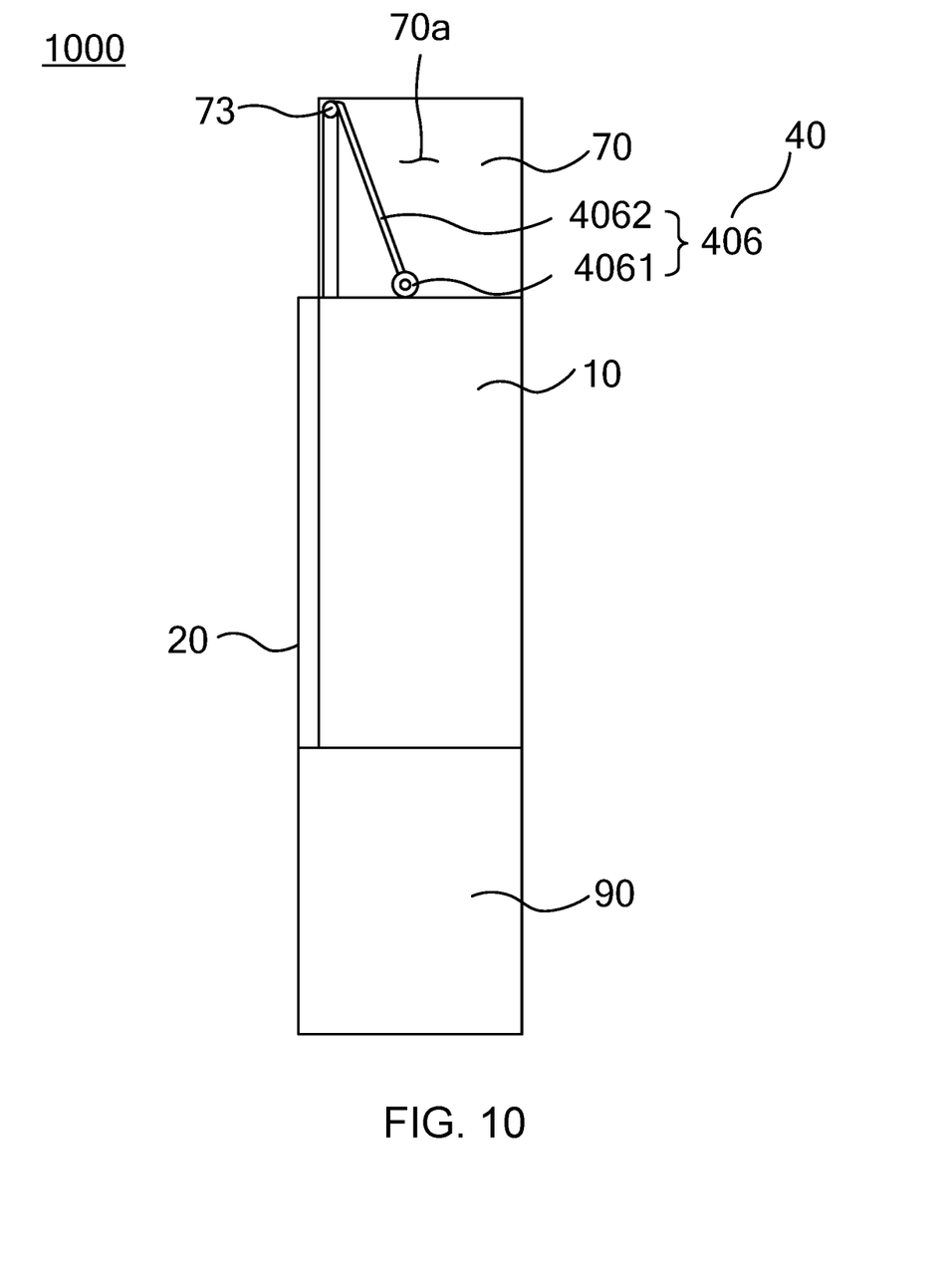
FIG. 10 is a front view of another display cabinet, in accordance with some embodiments.

In some examples, as shown in FIGS. 9 and 10, the action mechanism 40 includes the reel and belt mechanism 406. The reel and belt mechanism 406 includes a reel 4061 and a belt 4062. One end of the belt 4062 is fixedly connected with the reel 4061, and the other end of the belt 4062 is fixedly connected with an end portion (e.g., lower end portion) of the transparent display screen 20. When the belt 4062 winds on the reel 4061 or the belt 4062 is released from the reel 4061, the other end of the belt 4062 away from the reel drives the transparent display screen 20 to rise or descend, so that the transparent display screen 20 moves between the position covering the opening 11 and the position exposing the opening 11 in the second direction Y.

In some embodiments, as shown in FIGS. 1 to 3 and 5 to 9, the drive device 30 further includes a power source 41 and a controller 42 connected thereto. The power source 41 provides power to the action mechanism 40 under control of the controller 42, so that the action mechanism 40 can drive the transparent display screen 20 to perform the vertical movement.

For example, the power source 41 may be a direct current (DC) drive motor, an alternating current (AC) drive motor, or the like, and the power source 41 may supply power to the action mechanism 40 under the control of the controller 42.

For example, the power source 41 provides power to the screw drive mechanism 401, so that the screw shaft 4011 can rotate. As another example, the power source 41 provides power to the cylinder mechanism 402, so that piston rod 4022 can move in the second direction Y. As yet another example, the power source 41 provides power to the gear and rack mechanism 403, so that the gear 4031 can rotate. As yet another example, the power source 41 provides power to the crank and slider mechanism 404, so that the crank 4041 can drive the connecting rod 4042 to move. As yet another example, the power source 41 provides power to the chain mechanism 405, so that the sprocket 4051 can rotate. As yet another example, the power source 41 provides power to the reel and belt mechanism 406, so that the reel 4061 can rotate.

For example, the controller 42 may be an integrated circuit chip having signal processing capabilities. The controller 42 may be a central processing unit (CPU), a general-purpose processor, a digital signal processor (DSP), an application-specific integrated circuit (ASIC), a field programmable gate array (FPGA) or other programmable logic device, transistor logic device, hardware component, or any combination thereof.

In some embodiments, the controller 42 is integrated with the power source 41 as a whole. As a result, the cost may be saved and the reliability of the display cabinet 1000 may be enhanced.

In some embodiments, as shown in FIGS. 1 to 3, the display cabinet 1000 further includes a host 50. The host 50 may transmit and receive signals with the controller 42, and the host 50 is configured to transmit a command to the controller 42, so that the controller 42 controls the power source 41 to drive the action mechanism 40 to perform corresponding actions according to the command.

For example, the host 50 may include a CPU, a memory, a motherboard, a hard disk, an optical drive, a power supply, a chassis, a heat dissipation system, and other input/output controllers and ports, which may implement or perform the functions described above in connection with the embodiments of the disclosure.

In some embodiments, the host 50 may further receive a feedback signal sent by the controller 42.

In some embodiments, as shown in FIGS. 1 to 3 and 5 to 7, the host 50 and the transparent display screen 20 are connected through a connecting line L, and the connecting line L is configured to transmit at least one of a video signal, an audio signal, a data signal, or a control signal.

In some embodiments, as shown in FIG. 5, the host 50 further includes a wireless communication module 51. The wireless communication module 51 is configured to receive a command sent by an external wireless device to the host 50. The external device may be a mobile terminal such as a mobile phone or a tablet computer. In this way, it is possible to communicate with the host 50 through a application program (e.g., app) on the mobile phone or the tablet computer. For example, the visitors may control the transparent display screen 20 to display relevant contents and control actions of the drive device 30 through the program on the mobile phone or the tablet computer.

For example, the wireless communication module 51 includes an integrated circuit (IC) for signal transmission and an integrated circuit (IC) for signal reception. The IC for signal transmission may include a buffer, a modulation circuit, an amplification circuit, an antenna, and the like. The IC for signal reception may include a demodulation circuit, an antenna, and the like. The above description of the wireless communication module 51 is only an example, and the embodiments of the present disclosure are not limited thereto as long as the wireless communication module 51 can receive the command sent by the external wireless device to the host 50.

In some embodiments, as shown in FIG. 5, the display cabinet 1000 further includes a separate input device 12. For example, the input device 12 is a microphone or a keyboard, and the visitors may send an operation command to the host 50 through voice input and/or key input. As a result, the display cabinet 1000 may be controlled flexibly and diversely, which improves the user experience of the visitors.

In some embodiments, the transparent display screen 20 is a transparent touch display screen. The visitors may operate the display cabinet 1000 by touching the display screen. For example, the visitors may perform interactive actions by clicking menus, buttons, and icons displayed on the display screen. For example, the touch display screen is a capacitive, a resistive, or an infrared touch display screen. The visitors may communicate with the host 50 by operating the transparent display screen 20, so as to control the drive device 30.

The host 50 provides a display signal to the transparent display screen 20 through the connecting line, and may receive a touch signal generated in the transparent display screen 20.

In some embodiments, as shown in FIG. 5, the transparent display screen 20 is provided with an audio device 21, and the audio device 21 may emit sound, so that the visitors may hear the corresponding commentary while seeing the image shown on the transparent display screen 20.

In some embodiments, as shown in FIGS. 1 to 3 and 5 to 7, the display cabinet further includes a drag chain track 60, and the drag chain track 60 is configured to accommodate at least one conductive line.

In some examples, the drag chain track 60 wraps the connecting line connecting the host 50 and the transparent display screen 20. In some other examples, the drag chain track 60 wraps a power line for the transparent display screen 20. In some other examples, the drag chain track 60 wraps the connecting line connecting the host 50 and the transparent display screen 20 and the power line.

In the embodiments, by wrapping the conductive lines such as the connecting line and the power line in the drag chain track 60, it may be possible to prevent the conductive lines from being broken during a lifting process of the transparent display screen 20, so as to ensure a long-term stable operation of the lines.

In some embodiments, as shown in FIGS. 1 to 8, the display cabinet 1000 further includes a support device 70. The support device 70 has a mounting cavity 70a, and the drive device 30 is disposed in the mounting cavity 70a of the support device 70.

In some examples, as shown in FIGS. 1 to 7, the support device 70 is located under the case 10. In some other examples, as shown in FIGS. 8, 9 and 10, the support device 70 is located on the case 10.

In some embodiments, as shown in FIGS. 1 and 2, a guide assembly 71 is provided on the support device 70, and a mating assembly 72 is correspondingly provided on the transparent display screen 20. The transparent display screen 20 can move up and down along the guide assembly 71 through the mating assembly 72, which avoids instability of the transparent display screen 20 during movement.

In some embodiments, as shown in FIGS. 1 to 2, the guide assembly 71 includes a first guide rail 711 and a second guide rail 712 arranged at intervals, which are fixed at different positions of the support device 70. The mating assembly 72 includes a first slider 721 and a second slider 722, which are connected with two opposite end portions (e.g., upper and lower end portions) of the transparent display screen 20, respectively. The first slider 721 is slideably connected with the first guide rail 711, while the second slider 722 is slideably connected with the second guide rail 712.

In FIGS. 1 and 2, the first guide rail 711 and the second guide rail 712 each extend in parallel to the second direction Y, and the first slider 721 and the second slider 722 are respectively connected to the right end portion and the left end portion of the transparent display screen 20, which are opposite to each other. In this way, the transparent display screen 20 can move in the second direction Y through the mating assembly 72.

It can be understood that there are many ways to realize the transparent display screen 20 moving between the position covering the opening 11 and the position exposing the opening 11 under the driving of the drive device 30. For example, the supporting device 70 may be disposed at the left or right side of the casing 10; accordingly, the first guide rail 711 and the second guide rail 712 each extend in parallel to the first direction X, and the first slider 721 and the second slider 722 are respectively connected to the opposite upper end portion and the lower end portion of the transparent display screen. In this way, the transparent display screen 20 can move in the first direction X through the mating assembly 72.

Figure 11:
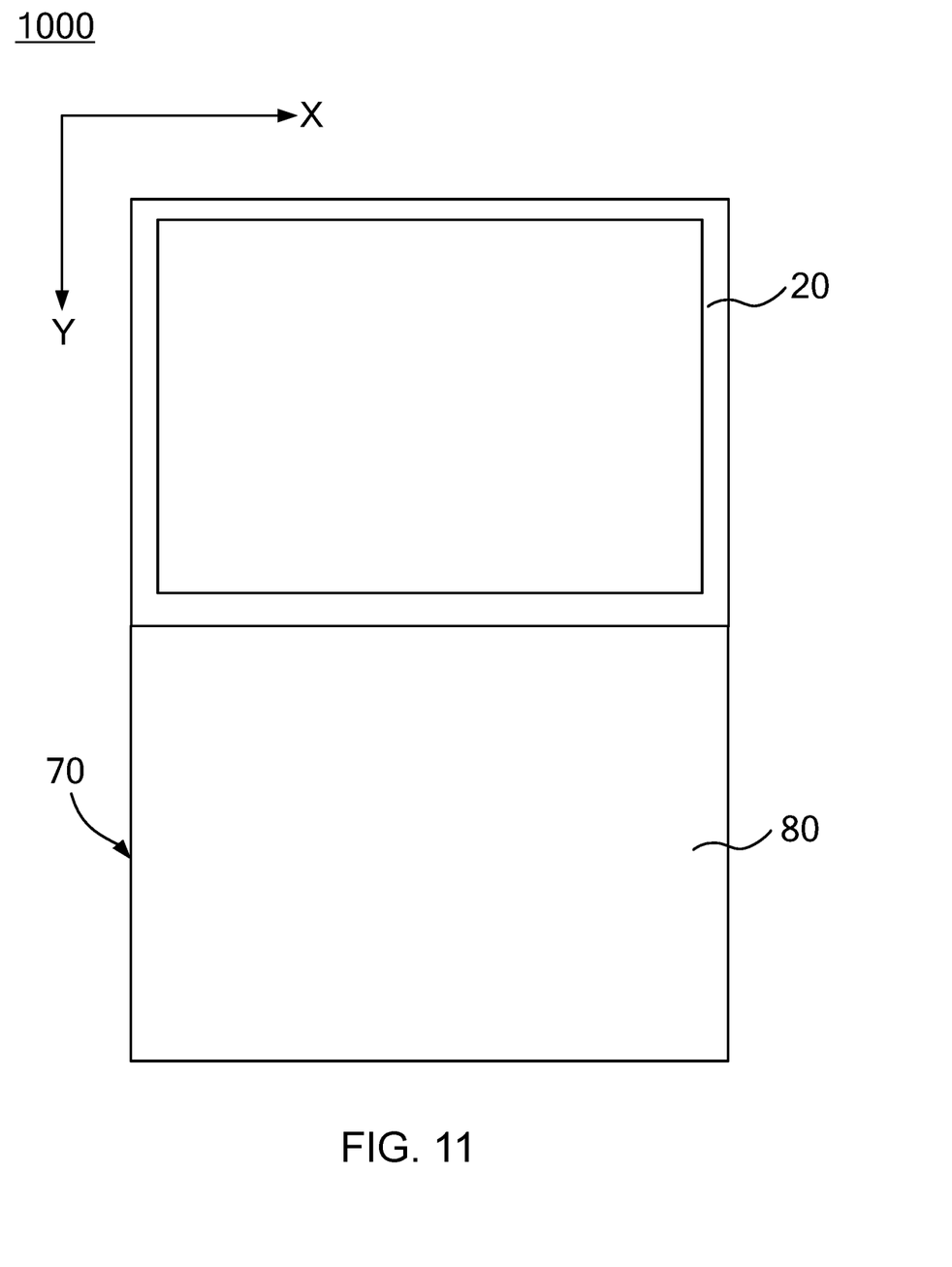
FIG. 11 is a side view of the display cabinet in FIG. 10.

In some embodiments, as shown in FIG. 11, a shield plate 80 is provided on the support device 70, and the shield plate 80 is configured to at least shield the transparent display screen 20 when the transparent display screen 20 is at the position exposing the opening 11. Here, it will be noted that, the transparent display screen 20 may be completely shielded when the opening 11 is completely exposed, or the transparent display screen 20 may be completely shielded when the opening 11 is partially exposed. The embodiments of the present disclosure do not limit this, as long as a shielding function can be achieved, so as to protect the transparent display screen 20.

For example, there is a gap between the shield plate 80 and the guide assembly 71 of the support device 70 that can allow the transparent display screen 20 to pass therethrough. In this way, the shield plate 80 may not only provide space for allowing the transparent display screen 20 to pass through when the transparent display screen 20 descends, but also shield the transparent display screen 20 when the transparent display screen 20 descends to the position exposing the opening, thereby protecting the transparent display screen 20.

For example, the support device 70 may have an opening, so as to facilitate an installation of components such as the drive device therein, and it is beneficial to improve a heat dissipation effect.

On this basis, for example, the shield plate 80 may also shield devices in the mounting cavity of the support device 70, such as the drive device 30 and the host, thereby achieving aesthetics and high safety.

In some embodiments, as shown in FIGS. 9 and 10, the support device 70 is disposed on the case 10. In this case, a support cabinet 90 may be provided under the case 10.

For example, the support cabinet 90 has a mounting cavity. In this case, the host 50 may be disposed in the mounting cavity of the support device 70 or the mounting cavity of the support cabinet 90. By providing the support cabinet 90, the case 10 may be elevated, for example, to a position that is approximately flush with the human eyes. In this way, it is more convenient for people to view the exhibit in the case.

Hereinafter, the display cabinet 1000 in one embodiment of the present disclosure will be described with reference to FIGS. 1 to 5. The display cabinet 1000 includes the case 10 with the opening 11 at a side thereof, the transparent touch display screen 20, the drive device 30, the host 50 and the support device 70.

The transparent touch display screen 20 is an infrared touch screen, which includes a display screen and an infrared touch block (not shown in the figures) located in front of the display screen.

The drive device 30 includes a motor 41 as the power source, the controller 42, and the screw drive mechanism 401. The screw drive mechanism 401 includes the screw shaft 4011 and the rotary member 4012. The rotary member 4012 is fixedly connected with the lower end portion of the transparent display screen 20.

The host 50 can transmit and receive signals with the transparent touch display screen 20 and the controller 42. The host 50 is configured to provide the display signal to the transparent display screen 20 and receive the touch signal generated in the transparent display screen 20. The host 50 is further configured to transmit a command to the controller 42, so that the controller 42 controls the power source 41 to provide power to the screw drive mechanism 401, and the screw drive mechanism 401 drives the transparent display screen 20 to perform corresponding actions.

As shown in FIG. 5, the host 50 further includes the wireless communication module 51. The wireless communication module 51 may be connected with external devices such as the mobile phone or the tablet computer, and may communicate with the host 50 through the application program on the mobile phone or the tablet computer.

The case 10 is disposed on the support device 70, and the drive device 30 is disposed in the mounting cavity 70a of the support device 70. The first guide rail 711 and the second guide rail 712 are respectively arranged on two opposite side plates of the support device 70. It can be understood that the surface of the side plate on which the first rail 711 is located is aligned with the surface of the side plate on which the second rail 712 is located. The first slider 721 and the second slider 722 are respectively arranged on the right end portion and the left end portion of the transparent display screen 20. The first slider 721 is slideably connected with the first guide rail 711, and the second slider 722 is slideably connected with the second guide rail 712.

When the visitors view the exhibit 100, the visitors can interact and browse information displayed on the transparent display screen 20 by operating the infrared touch screen, and see the exhibit 100 in the case 10 as well.

When the visitors want to further view the exhibit 100 in the display cabinet 1000, the visitors may send a command for requiring the transparent touch display screen 20 to descend through the program on the mobile phone or the tablet computer; after receiving the command, the host 50 performs arithmetic processing and sends a corresponding command to the controller 42; then the controller 42 controls the motor 41 to drive the screw shaft 4011 to rotate in a direction according to the command; the rotary member 4012 cooperates with the screw shaft 4011, and the rotary member 4012 descends along the screw shaft 4011, thereby driving the transparent touch display screen 20 to descend steadily in a direction parallel to the guide rails.

When the transparent touch display screen 20 descends to the position where the opening 11 is completely exposed or the position where the opening 11 is partially exposed, and the exhibit can be taken out from the exposed opening 11, the visitors may take out the exhibit 100 in the case 10 for appreciation, and put the exhibit 100 back into the case 10 after the appreciation is finished. Then, the visitors send a command to the host 50 through the program on the mobile phone or the tablet computer; after receiving the command, the host 50 performs the arithmetic processing and sends a corresponding command to the controller 42; then the controller 42 controls the motor 41 to drive the screw shaft 4011 to rotate in a direction opposite to the above mentioned direction according to the command; the rotary member 4012 cooperates with the screw shaft 4011, and the rotary member 4012 rises along the screw shaft 4011, thereby driving the transparent touch display screen 20 to rise steadily in the direction parallel to the guide rails. As a result, the transparent display screen 20 completes a complete vertical movement.

Hereinafter, the display cabinet 1000 in another embodiment of the present disclosure will be described with reference to FIGS. 9 and 10. The support device 70 is provided on the case 10, and the support cabinet 90 is provided under the case 10.

The drive device 30 is disposed in the mounting cavity 70a of the support device 70. The drive device 30 includes a motor 41 as the power source, the controller 42 and the reel and belt mechanism 406. The reel and belt mechanism 406 includes the reel 4061 and the belt 4062.

The reel 4061 is connected with an output shaft of the motor 41. One end of the belt 4062 is fixedly connected with the reel 4061, and the other end of the belt 4062 is fixedly connected with the upper end portion of the transparent display screen 20.

The guide assembly 71 and a support shaft 73 are disposed in the mounting cavity 70a of the support device 70. The guide assembly 71 includes two guide rails (e.g., slide grooves) opposite to each other, which is used to guide the lifting of the transparent display screen 20. The support shaft 73 is used to support the belt 4062. For example, the support shaft 73 is a rotatable shaft.

When the transparent display screen 20 performs the vertical movement, the motor 41 drives the reel 4061 to rotate, so that the belt 4062 is wrapped on the reel 4061 or is released from the reel 4061. As a result, the other end of the belt 4062 away from the reel 4061 drives the transparent display screen 20 to rise or descend accordingly, thereby exposing the opening 11 or covering the opening 11.

The specific operation process is similar to the operation process of the display cabinet 1000 in the previous embodiments, which will not be repeated here.

Some of the embodiments only consider the screw drive mechanism and the reel and belt mechanism as examples for detailed description. However, it will be noted that other linear drive mechanisms may also be adopted to achieve a movement of the transparent display screen 20 between the position covering the opening and the position exposing the opening. Moreover, one or more drive devices may be disposed on and under the transparent display screen 20, so that the drive devices cooperate to work.

The foregoing descriptions are merely specific implementation manners of the present disclosure, but the protection scope of the present disclosure is not limited thereto. Any person skilled in the art could conceive of changes or replacements within the technical scope of the present disclosure, which shall be included in the protection scope of the present disclosure. Therefore, the protection scope of the present disclosure shall be subject to the protection scope of the claims.

What is claimed is:

1. A display cabinet, comprising:
   a case with an opening at a side thereof;
   a transparent display screen disposed at the opening;
   a drive device connected with the transparent display screen, the drive device being configured to drive the transparent display screen to be movable between a position covering the opening and a position exposing the opening, wherein the drive device is connected with one end portion of two opposite end portions of the transparent display screen;
   a support device disposed at a side of the case proximate to the end portion the transparent display screen, the support device having a mounting cavity accommodating the drive device;
   a guide assembly disposed on the support device;
   a mating assembly slidably cooperate with the guide assembly, the mating assembly being fixedly connected with the transparent display screen; and a shield plate connected with the support device, the shield plate being configured to shield the transparent display screen when the transparent display screen moves at the position exposing the opening, wherein there is a gap between the shield plate and the guide assembly that allows the transparent display screen to pass therethrough.

2. The display cabinet according to claim 1, wherein the drive device includes an action mechanism, the action mechanism includes at least one of:
a screw drive mechanism,
a cylinder mechanism,
a gear and rack mechanism,
a crank and slider mechanism,
a chain mechanism, or
a reel and belt mechanism.

3. The display cabinet according to claim 2, wherein the action mechanism includes the screw drive mechanism, the screw drive mechanism includes:
a screw shaft, and
a rotary member pivotally connected with the screw shaft, the rotary member being further fixedly connected with the end portion of the transparent display screen.

4. The display cabinet according to claim 2, wherein the action mechanism includes the cylinder mechanism, the cylinder mechanism includes:
a cylinder barrel, and
a piston rod connected with the cylinder barrel, the piston rod being further fixedly connected with the end portion of the transparent display screen.

5. The display cabinet according to claim 2, wherein the action mechanism includes the gear and rack mechanism, the gear and rack mechanism includes:
a gear, and
a rack connected with the gear, the rack being further fixedly connected with the end portion of the transparent display screen.

6. The display cabinet according to claim 2, wherein the action mechanism includes the crank and slider mechanism, the crank and slider mechanism includes:
a bracket,
a crank connected with the bracket,
a connecting rod connected with the crank, and
a slider connected with the connecting rod, the slider being further fixedly connected with the end portion of the transparent display screen.

7. The display cabinet according to claim 2, wherein the action mechanism includes the chain mechanism, the chain mechanism includes:
a sprocket, and
a chain meshing with the sprocket, an end of the chain being fixedly connected with the end portion of the transparent display screen.

8. The display cabinet according to claim 2, wherein the action mechanism includes the reel and belt mechanism, the reel and belt mechanism includes:

a reel, and
a belt, one end of the belt being fixedly connected with the reel and another end of the belt being fixedly connected with the end portion of the transparent display screen.

9. The display cabinet according to claim 2, wherein the drive device further includes:
a controller, and
a power source connected with the controller, the power source being configured to provide power to the action mechanism under control of the controller.

10. The display cabinet according to claim 9, further comprising:
a host configured to transmit and receive signals with the controller, and
a connecting line for connecting the host and the transparent display screen, the connecting line being configured to transmit at least one of a video signal, an audio signal, or a data signal.

11. The display cabinet according to claim 10, wherein the host includes a wireless communication module configured to receive a command sent by an external wireless device to the host.

12. The display cabinet according to claim 10, further comprising an input device configured to send a command to the host through at least one of a voice input or a key input.

13. The display cabinet according to claim 1, wherein the transparent display screen is a transparent touch display screen.

14. The display cabinet according to claim 13, further comprising:
a host, and
a connecting line for connecting the host and the transparent touch display screen, wherein
the host is configured to: provide a display signal to the transparent touch display screen through the connecting line, and receive a touch signal generated in the transparent touch display screen.

15. The display cabinet according to claim 1, further comprising a drag chain track configured to accommodate a conductive line.

16. The display cabinet according to claim 1, wherein the guide assembly includes:
a first guide rail and a second guide rail spaced apart from each other, the first guide rail and the second guide rail being fixed at different positions of the support device; and
the mating assembly includes:
a first slider and a second slider that are connected with another two opposite end portions of the transparent display screen, wherein
the first slider is slideably connected with the first guide rail, and the second slider is slideably connected with the second guide rail.

* * * * *